United States Patent

Hsiao et al.

[15] 3,685,014

[45] Aug. 15, 1972

[54] AUTOMATIC DOUBLE ERROR DETECTION AND CORRECTION DEVICE

[72] Inventors: My-Yue Hsiao; Wadie F. Mikhail, both of Poughkeepsie, N.Y.

[73] Assignee: International Business Machines Corporation, Armonk, N.Y.

[22] Filed: Oct. 9, 1970

[21] Appl. No.: 79,553

[52] U.S. Cl. ..........................................340/146.1 AL

[51] Int. Cl. ..........................G06f 11/12, G08c 25/00

[58] Field of Search ...340/146.1 AL, 172.5; 235/153

[56] References Cited

UNITED STATES PATENTS

| | | | |
|---|---|---|---|
| 3,402,390 | 9/1968 | Tsimbidis et al | 340/146.1 |
| 3,437,995 | 4/1969 | Watts | 340/146.1 |
| 3,504,340 | 3/1970 | Allen | 340/146.1 |
| 3,478,313 | 11/1969 | Srinivasan | 340/146.1 |
| 3,560,925 | 2/1971 | Ohnsorge | 340/146.1 |

*Primary Examiner*—Charles E. Atkinson

*Attorney*—Ralph L. Thomas and Thomas and Thomas

[57] ABSTRACT

A method and apparatus are provided for detecting and correcting double errors and detecting triple errors by generating syndrome S bits from check bits and data bits of a binary word. The syndrome S bits themselves are decoded to locate and correct single errors. Code bit combinations $h_1$, $h_2$,–$h_n$ which indicate the location of the single errors are compared with the syndrome S bits by successive half add operations to produce successive results $R_1$, $R_2$,–$R_n$. If double errors occur in the binary word, the syndrome S bits reflect the double error by the relationship $S = h_i \veebar h_j$. When $i$ compare or half add operations are performed, the result $R_i$ yields a discrete combination of code bits which indicates the location of one of the double errors because $R_x = S \veebar h_i = h_j$. Then $h_j$ is decoded to correct one of the double errors. When one of the double errors is corrected, a new set of syndrome $S$ bits is generated, and this yields $S = h_i$. The syndrome $S$ bits are decoded next to correct the second error in the binary word. Thus double errors occurring in bits $i$ and $j$ of the binary word are detected and corrected.

16 Claims, 5 Drawing Figures

INVENTORS
MU-YUE HSIAO
WADIE F. MIKHAIL
BY *Thomas & Thomas*
ATTORNEYS

AUTOMATIC DOUBLE ERROR DETECTION AND CORRECTION DEVICE

CROSS REFERENCE TO A RELATED APPLICATION

Application Ser. No. 887,858. "Optimum Apparatus and Method For Checking Bit Generation and Error Detection, Location and Correction" by M. Y. Hsiao et al. filed Dec. 24, 1969.

BACKGROUND OF THE INVENTION

This invention relates to error detection and correction devices and more particularly to such devices for detecting and correcting single and double errors in binary words.

If accuracy must be assured in data processing equipment, it is customary to provide single error detection and correction equipment even though the added cost may be relatively high. When one of the many types of earlier checking equipment is added to detect and correct double errors, the cost becomes exceedingly high because of the large quantity of equipment involved, particularly as the word length increases because the added redundancy expands at a rapid rate. The need exists, therefore, for error detection and correction equipment which detects and corrects double errors in a binary word having many bits and which does so with only a moderate increase in cost. It is to this problem that the present invention is directed.

SUMMARY OF THE INVENTION

It is a feature of this invention to provide a novel error detection and correction device which can detect and correct single and double errors in a binary word.

It is a feature of this invention to provide an improved error detection and correction device at a moderate cost which can detect and correct single and double errors in a binary word which has many binary bits.

It is a feature of this invention to provide a novel method for detecting and correcting single and double errors in a binary word which has many bits.

In one arrangement according to this invention, a register stores bits of a binary word having check bits and data bits, and a checking device is connected to the register which compares each check bit with various data bits thereby to generate a plurality of syndrome $S$ bits. The syndrome $S$ bits are supplied to a decoder, and when single error exists, the decoder locates and corrects the single error. When double errors exist in the binary word, the syndrome $S$ bits are supplied to a compare circuit where they are compared or half added to discrete code bit combinations $h_1, h_2, -h_n$ of a matrix H to generate a result $R_i$ where $R_i = S \forall h_i = h_j$ when errors occur in word bits $i$ and $j$ of the register. The result of each compare operation is supplied to the decoder, and when the result $R_i$ is generated, the decoder locates and corrects the first of the double errors. The checking device then generates a new set of syndrome $S$ bits from the modified binary word which then has a single error, and the new syndrome $S$ bits are supplied to the decoder which locates and corrects the second of the double errors.

A novel method is provided according to this invention for detecting and correcting single and double errors in word bits of a binary word having check bits and data bits, and the method comprises the steps of:

1. generating a plurality of syndrome $S$ bits from the check bits and the data bits of the binary word,
2. comparing the syndrome $S$ bits with discrete code bit combinations $h_1, h_2, -h_n$ of a matrix H to generate a result $R_i = S \forall h_i = h_j$ when word bits $i$ and $j$ are in error.
3. using $R_i$ to correct word bit $j$,
4. then generating a new set of syndrome $S$ bits where $S = h_i$ for the remaining single error, and
5. using $S = h_i$ to correct bit i of the binary word.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
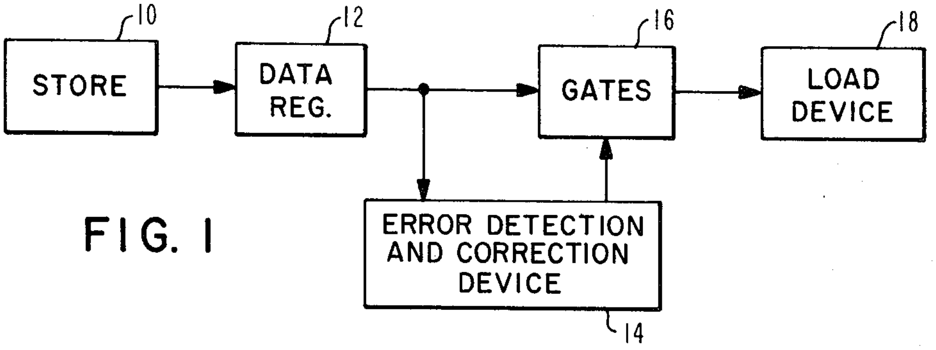
FIG. 1 illustrates a system which utilizes an error detection and correction device.

The apparatus according to this invention detects and corrects single errors and it detects and corrects double errors. The single error case is treated separately from the double error case. Various error detection and correction codes may be effectively employed. The Bose-Chaudhuri class of error detection and correction codes are suitable. The particular one of this class of codes employed depends upon the length of the binary word. The Bose-Chaudhuri class of error detection and correction codes are particularly well suited for binary words having a relatively long length or high number of binary bits. The invention is illustrated by using a long binary word having 79 bits. It is pointed out, however, that this word length is arbitrarily selected, and the invention is applicable also to binary words having a word length which is increased or diminished. If a binary word of 79 bits is assumed for illustrative purposes, it has 15 check bits and 64 data bits. The word format is as follows: Word Bits - 1 2 3 - - - 15 16 17 - - - 79 (1)

Type - C1 C2 C3 - C15 - DB1 DB2 - - - DB64

The 79 bits of the word can be supplied to an Exclusive OR tree circuit to yield the word syndrome of S bits. The word syndrome of S bits for this example are characterized as follows:

$$S = s_1, s_2, -s_{15}$$

The logical manner in which the syndrome S bits are determined is treated in detail subsequently.

A suitable one of the Bose-Chaudhuri codes which may be employed in this invention is given below in Table 1.

TABLE 1

Columns

| Row | 1 2 3 4 5 6 7 8 9 10 | 11 | 12 | 13 | 14 | 15 | |
|---|---|---|---|---|---|---|---|
| 1- | 1000000000 | 0 | 0 | 0 | 0 | 0 | -h1 |
| 2- | 0100000000 | 0 | 0 | 0 | 0 | 0 | -h2 |
| 3- | 0010000000 | 0 | 0 | 0 | 0 | 0 | -h3 |
| 4- | 0001000000 | 0 | 0 | 0 | 0 | 0 | -h4 |
| 5- | 0000100000 | 0 | 0 | 0 | 0 | 0 | -h5 |
| 6- | 0000010000 | 0 | 0 | 0 | 0 | 0 | -h6 |
| 7- | 0000001000 | 0 | 0 | 0 | 0 | 0 | -h7 |
| 8- | 0000000100 | 0 | 0 | 0 | 0 | 0 | -h8 |
| 9- | 0000000010 | 0 | 0 | 0 | 0 | 0 | -h9 |
| 10- | 0000000001 | 0 | 0 | 0 | 0 | 0 | -h10 |
| 11- | 0000000000 | 1 | 0 | 0 | 0 | 0 | -h11 |
| 12- | 0000000000 | 0 | 1 | 0 | 0 | 0 | -h12 |
| 13- | 0000000000 | 0 | 0 | 1 | 0 | 0 | -h13 |
| 14- | 0000000000 | 0 | 0 | 0 | 1 | 0 | -h14 |
| 15- | 0000000000 | 0 | 0 | 0 | 0 | 1 | -h15 |
| 16- | 1100010110 | 0 | 1 | 1 | 0 | 0 | -h16 |
| 17- | 0110001011 | 0 | 0 | 1 | 1 | 0 | -h17 |
| 18- | 0011000101 | 1 | 0 | 0 | 1 | 1 | -h18 |
| 19- | 1101110100 | 1 | 0 | 1 | 0 | 1 | -h19 |
| 20- | 1010101100 | 0 | 0 | 1 | 1 | 0 | -h20 |
| 21- | 0101010110 | 0 | 0 | 0 | 1 | 1 | -h21 |
| 22- | 1110111101 | 0 | 1 | 1 | 0 | 1 | -h22 |
| 23- | 1011001000 | 1 | 1 | 0 | 1 | 0 | -h23 |
| 24- | 0101100100 | 0 | 1 | 1 | 0 | 1 | -h24 |
| 25- | 1110100100 | 0 | 1 | 0 | 1 | 0 | -h25 |
| 26- | 0111010010 | 0 | 0 | 1 | 0 | 1 | -h26 |
| 27- | 1111111111 | 0 | 1 | 1 | 1 | 0 | -h27 |
| 28- | 0111111111 | 1 | 0 | 1 | 1 | 1 | -h28 |
| 29- | 1111101001 | 1 | 0 | 1 | 1 | 1 | -h29 |
| 30- | 1011100010 | 1 | 0 | 1 | 1 | 1 | -h30 |
| 31- | 1001100111 | 0 | 0 | 1 | 1 | 1 | -h31 |
| 32- | 1000100101 | 1 | 1 | 1 | 1 | 1 | -h32 |
| 33- | 1000000100 | 1 | 0 | 0 | 1 | 1 | -h33 |
| 34- | 1000010100 | 0 | 0 | 1 | 0 | 1 | -h34 |
| 35- | 1000011100 | 0 | 1 | 1 | 1 | 0 | -h35 |
| 36- | 0100001110 | 0 | 0 | 1 | 1 | 1 | -h36 |
| 37 | 1110010001 | 0 | 1 | 1 | 1 | 1 | -h37 Matrix H |
| 38- | 1011011110 | 1 | 1 | 0 | 1 | 1 | -h38 |
| 39- | 1001111001 | 0 | 0 | 0 | 0 | 1 | -h39 |
| 40- | 1000101010 | 1 | 1 | 1 | 0 | 0 | -h40 |
| 41- | 0100010101 | 0 | 1 | 1 | 1 | 0 | -h41 |
| 42- | 0010001010 | 1 | 0 | 1 | 1 | 1 | -h42 |
| 43- | 1101010011 | 0 | 0 | 1 | 1 | 1 | -h43 |
| 44- | 1010111111 | 1 | 1 | 1 | 1 | 1 | -h44 |
| 45- | 1001001001 | 1 | 0 | 0 | 1 | 1 | -h45 |
| 46- | 1000110010 | 1 | 0 | 1 | 0 | 1 | -h46 |
| 47- | 1000001111 | 0 | 0 | 1 | 1 | 0 | -h47 |
| 48- | 0100000111 | 1 | 0 | 0 | 1 | 1 | -h48 |
| 49- | 1110010101 | 1 | 0 | 1 | 0 | 1 | -h49 |
| 50- | 1011011100 | 1 | 0 | 1 | 1 | 0 | -h50 |
| 51- | 0101101110 | 0 | 1 | 0 | 1 | 1 | -h51 |
| 52- | 1110100001 | 0 | 1 | 0 | 0 | 1 | -h52 |
| 53- | 1011000110 | 1 | 1 | 0 | 0 | 0 | -h53 |
| 54- | 0101100011 | 0 | 1 | 1 | 0 | 0 | -h54 |
| 55- | 0010110001 | 1 | 0 | 1 | 1 | 0 | -h55 |
| 56- | 0001011000 | 1 | 1 | 0 | 1 | 1 | -h56 |
| 57- | 1100111010 | 0 | 0 | 0 | 0 | 1 | -h57 |
| 58- | 1010001011 | 0 | 1 | 1 | 0 | 0 | -h58 |
| 59- | 0101000101 | 1 | 0 | 1 | 1 | 0 | -h59 |
| 60- | 0010100010 | 1 | 1 | 0 | 1 | 1 | |
| 61- | 1101000111 | 0 | 0 | 0 | 0 | 1 | -h61 |
| 62- | 1010110101 | 1 | 1 | 1 | 0 | 0 | -h62 |
| 63- | 0101011010 | 1 | 1 | 1 | 1 | 0 | -h63 |
| 64- | 0010101101 | 0 | 1 | 1 | 1 | 1 | -h64 |
| 65- | 1101000000 | 1 | 1 | 0 | 1 | 1 | -h65 |
| 66- | 1010110110 | 0 | 0 | 0 | 0 | 1 | -h66 |
| 67- | 1001001101 | 0 | 1 | 1 | 0 | 0 | -h67 |
| 68- | 0100100110 | 1 | 0 | 1 | 1 | 0 | -h68 |
| 69- | 0010010011 | 0 | 1 | 0 | 1 | 1 | h69 |
| 70- | 1101011111 | 1 | 1 | 0 | 0 | 1 | -h70 |
| 71- | 1010111001 | 1 | 0 | 0 | 0 | 0 | -h71 |
| 72- | 0101011100 | 1 | 1 | 0 | 0 | 0 | -h72 |
| 73- | 0010101110 | 0 | 1 | 1 | 0 | 0 | -h73 |
| 74- | 0001010111 | 0 | 0 | 1 | 1 | 0 | -h74 |
| 75- | 0000101011 | 1 | 0 | 0 | 1 | 1 | -h75 |
| 76- | 110000001 | 1 | 0 | 1 | 0 | 1 | -h76 |
| 77- | 1010010111 | 1 | 0 | 1 | 1 | 0 | -h77 |
| 78- | 0101001011 | 1 | 1 | 0 | 1 | 1 | -h78 |
| 79- | 1110110011 | 1 | 0 | 0 | 0 | 1 | -h79 |

Table 1 illustrates an error detection and correction code in the form of a matrix H. The matrix H has 79 rows numbered 1 through 79 with each row having 15 binary bits. The rows 1 through 79 are designated respectively as *h*1 through *h*79. The matrix H has 15 columns with each column having 79 binary bits. Each of the columns 1 through 15 in Table 1 are related to the respective check bits C1 through C15. The binary 1's in column 1 of Table 1 indicate which word bits the check bit C1 checks in the 79 bit word. For example, check bit C1 in an error free word has a parity which is related to the parity of word bits 16, 19, 20, 22, 23, 25, 27, 29, 30, 31, 32, 33, 34, 35, 37, 38, 39, 40, 43, 44, 45, 46, 47, 49, 50, 52, 53, 57, 58, 61, 62, 65, 66, 67, 70, 71, 76, 77 and 79. The particular word bits checked by check bit C1 readily are determined from the matrix H in Table 1 by noting that binary 1's are disposed in column 1 on the rows having the numbers set forth above. The row numbers in matrix H correspond to the bit numbers of a word. It is recalled that each word has 79 bits. It can be readily determined in this fashion from the matrix H in Table 1 which particular word bits are checked by the check bit C2 merely by noting the row numbers which have a binary 1 in column 2. In like manner it can be readily determined which word bits are checked by the check bits C3 through C15 merely by observing the location of binary 1 in the various rows in respective columns 3 through 15 in the matrix H of Table 1.

When the 79 bits of the word are supplied to an Exclusive Or tree, Exclusive Or circuits within the tree provide an output of 15 syndrome bits. Next, an explanation is given as to the manner in which the 15 syndrome bits are determined. The check bit C1 checks the word bits pointed out above. The logical function of Exclusive Oring these various word bits in the Exclusive Or tree is expressed as follows:

$$
\begin{aligned}
C1 = [16 \;&\veebar 19 \veebar 20 \veebar 22 \veebar 23 \veebar 25\\
\veebar 27 \;&\veebar 29 \veebar 30 \veebar 31 \veebar 32 \veebar 33\\
\veebar 34 \;&\veebar 35 \veebar 37 \veebar 38 \veebar 39 \veebar 40\\
\veebar 43 \;&\veebar 44 \veebar 45 \veebar 46 \veebar 47 \veebar 49\\
\veebar 50 \;&\veebar 52 \veebar 53 \veebar 57 \veebar 58\\
\veebar 61 \;&\veebar 62 \veebar 65 \veebar 66 \veebar 67 \veebar 70\\
\veebar 71 \;&\veebar 76 \veebar 77 \veebar 79] = \Sigma_1
\end{aligned} \tag{3}
$$

The result of this checking operation is $\Sigma_1$ which is a binary zero or a binary one, and it is compared with the check bit C1 to determine $s_1$. Thus $s_1$ is expressed as follows:

$$s_1 = C1 \veebar \Sigma_1 \quad (4)$$

The check bit C2 checks the corresponding word bits indicated by binary ones in column 2 of the matrix H in Table 1. Therefore, C2 may be expressed as follows:

$$C2 = [16 \veebar 17 \veebar 19 \veebar 21 \ldots \veebar 79] = \Sigma_2 \quad (5)$$

The result of this checking operation is $\Sigma_2$ which is a binary zero or a binary 1, and it is compared with the check bit C2 to determine $s_2$. Thus, $s_2$ is given thusly:

$$s_2 = C2 \veebar \Sigma_2 \quad (6)$$

It is easily seen, if this process is continued, how the syndrome bits $s_3 = C3 \veebar \Sigma_3$, $s_4 = C4 \veebar \Sigma_4 \ldots$ and $s_{15} = C15 \veebar \Sigma_{15}$ are determined.

Some of the properties of the word syndrome S bits are described next. If the word syndrome S bits are all equal to binary 0, no error exists, and the word is error free. This condition may be expressed thusly:

$$S = s_1, s_2, s_3 \ldots s_{15} = 0 \quad (7)$$

If bit $i$ of a word is in error, then the word syndrome S bits indicate a value other than zero. This condition may be expressed in the following manner:

$$S = s_1, s_2, s_3 \ldots s_{15} = h_i \quad (8)$$

If bits $i$ and $j$ are in error, then the word syndrome $S$ bits assume a condition which indicates a double error. This condition may be expressed thusly:

$$S = s_1, s_2, s_3 \ldots s_{15} = h_i \veebar h_j \quad (9)$$

If word bits i and j and k are in error, then the word syndrome S bits assume a condition for a triple error. This condition may be expressed as follows:

$$S = s_1, s_2, s_3 \ldots s_{15} = h_i \veebar h_j \veebar h_k \quad (10)$$

If the 15 syndrome bits have an odd value of 1's then there are an odd number of errors, and the number of errors may be 1, 3, 5, 7, etc. If the 15 syndrome bits have an even value of 1's, then there are an even number of mistakes. The even number of mistakes may be 2, 4, 6, 8, etc. It is assumed for purposes of this invention that one error exists in a word when the word syndrome S bits have an odd value. The case for a single error has a much greater probability of occurring than the case for a triple error. The case for triple errors has a greater probability than the case for quintuple errors, and the case for septuple errors has a much less probability than the case for quintuple errors. For an even number of 1's in the syndrome bits, the case for double errors has a greater probability of occurring than the case for quadruple errors. The case for sextuple errors has a much less probability than the case for quadruple errors, and the case for sextuple errors occurring is much greater than the case for octuple errors. The case for a single error has a much greater probability of occurring than the case for double errors. It is seen, therefore, that the case for a single error and the case for a double error have a much greater probability of occurring than the case for any other higher number of errors. If an error detection and correction device can correct for the cases of single and double errors, it is effective to correct almost all cases for errors in a word. It is this high probability that is covered by the error detection and correction device of this invention. It is pointed out that single error detection and correction devices are well known, and such devices utilizing the well known Hamming Code are illustrative. It is a novel feature of this invention, however, to correct double errors by compensating or masking out one of the double errors to perform a first detection and correction operation on one of the double errors and then perform a second detection and correction operation on the remaining one of the double errors. Next the compensating or masking technique is described.

The compensating or masking operation involves a matching technique. This is performed by Exclusive Oring the syndrome bits $S$ with the corresponding bits of $h_1$ in Table 1, and if this trial is not effective, then the syndrome bits are Exclusive Or'ed with corresponding bits of $h_2$ in Table 1. The process is repeated until an effective match is found. An effective match is found when one of the double errors in a word is compensated or masked out by the compare operation. In this event the result of the compare operation indicates the location of one of the double errors, and it may be corrected. The binary word then is changed from one having a double error to one having a single error. When one of the double errors is corrected, the word syndrome S bits change to reflect a single error. The syndrome bits S then indicate the location of the remaining single error, and it can be corrected. The validity of the compare operation is discussed next.

Beforehand, however, some underlying basic principles are presented with respect to a general case. A first underlying principle is this. If two binary words each have an odd number of ones, they will produce a result which is a binary word having an even number of ones when they are compared. The compare operation is essentially a half add operation, and it may be accomplished by supplying corresponding bits of the first word and corresponding bits of the second word to individual Exclusive Or circuits. The general case is expressed as follows:

$$A \veebar B = C \quad (11)$$

If word A has an odd number of ones and word B has an odd number of ones, then the word C must have an even number of ones if a half add operation of the Word A and the word B is performed. In a half add operation, the carries, both into each stage and out of each stage, are disregarded. A specific illustration is given below:

$$\begin{array}{r} A = 1\,1\,1\,0\,0\,1\,1 \\ B = \underline{0\,1\,0\,1\,1\,0\,0} \\ C = 1\,0\,1\,1\,1\,1\,1 \end{array} \quad (12)$$

The binary word A above has five ones in it, and the binary word B has three ones in it. The number of ones in each binary word is an odd number. After a half add operation is performed with the binary words A and B, the word C results. The result word C has six ones which is an even number.

A second underlying basic principle is this. If two binary numbers of equal value are half added, the result will be zero. The half add operation may be performed by supplying corresponding bits of each word to individual Exclusive Or circuits or half adders. This principle is illustrated below:

$$D = 1\ 1\ 1\ 0\ 0\ 1\ 1 \qquad (13)$$

$$E = \underline{1\ 1\ 1\ 0\ 0\ 1\ 1}$$

$$F = 0\ 0\ 0\ 0\ 0\ 0\ 0$$

A general case can be demonstrated for compensating or masking out one of two errors signified by the word syndrome S bits during compare operations with $h_1$, $h_2$, $h_3$–$h_{79}$ in Table 1 for the case where double errors exist. The case for double errors is expressed in equation 9 above, it is recalled. This case may be expressed simply as follows:

$$S = h_i \veebar h_j \qquad (14)$$

If $h_i$ or $h_j$ is added to both sides of equation 14, then the added quantity $h_i$ or $h_j$ is compensated out in the result. For purposes of illustration let it be assumed that $h_i$ is added. If $h_i$ is added to both sides of equation 14, the result is the following:

$$S \veebar h_i = h_i \vee h_i \vee h_j = R_i \qquad (15)$$

However, it is known from the second basic underlying principle stated above that the following is true:

$$h_i \veebar h_i = 0 \qquad (16)$$

$$\therefore \quad R_i = h_j \qquad (17)$$

The quantity $R_i$ is the result of Exclusive Oring or half adding the syndrome bits with the word $h_i$ taken from the ith row of the matrix H in Table 1. The quantity $R_i$ specifies the particular bit of a word which is in error. Hence, it can be used to correct one of the double errors. When one of the double errors, has been corrected, the syndrome bits change to indicate a single error which is expressed thusly:

$$S = h_j \qquad (18)$$

The word syndrome $S$ bits themselves then indicate the location of the second error in the word, and the syndrome S bits are utilized to correct the second error without further compare operations with $h_1$, $h_2$,–$h_{79}$ in Table 1. Thus both of the double errors are identified and corrected, and the word is then error free.

The first underlying principle above is employed to distinguish between the double error case expressed in equation 14 from the single error case expressed in equation 18. If the syndrome bits are even, then compare operations explained with reference to equations 15 through 17 are performed to locate one of the double errors. The result of one of the compare operations is employed to locate and correct one of the double errors in the manner explained. If the syndrome bits have an odd value, then a single error case is assumed as expressed in equation 18. In this case the syndrome bits S themselves are utilized to identify and correct the remaining one of the double errors.

From the foregoing demonstration of how double errors are detected and corrected, as explained with reference to equations 12 through 18, a general case may be stated as follows:

$$R_k = h_k \veebar S \qquad (19)$$

The quantity $R_k$ is the result of comparing the content of row $k$ of the matrix H in Table 1 with the syndrome bits for the double error case. The quantity k has any value between 1 and 79, and $h_k$ represents the code bits in the row $k$ of the matrix H in Table 1. It is pointed out that a plurality of compare operations may take place before the first of a pair of errors is found. Once one of the errors in a pair of errors is located and corrected by the comparing operations, the second error is readily identified and corrected by the syndrome bits as explained. Next the compare operations for the double error case are described in more detail.

If the word arrangement shown in equation 1 is used and a pair of errors occur, the two errors may be disposed in any one of many pair locations in the bits 1 through 79. There are many combinations of pair locations in the 79 bits of the binary word, and each bit of the word must be checked for an error until one of the errors is found. Bit 1 of the word is checked by comparing the syndrome bits with $h_1$ of the matrix H in Table 1. The result is $R_1$. A decoding arrangement can be employed which responds to $R_1$ if and only if, $R_1$ indicates a single error. In this connection it is pointed out that $R_1$ represents an invalid combination when it does not specify a single error. A decoding arrangement may be provided which responds to a valid combination of $R_1$ and disregards an invalid combination of $R_1$. If $R_1$ does not provide a valid combination which specifies a single error, this indicates that bit 1 is error free.

Bit 2 of the word is checked by comparing the syndrome bits with $h_2$ of the matrix H in Table 1. The result of this comparison is $R_2$. If $R_2$ is a valid combination, then $R_2$ is used to correct one of the two incorrect word bits. The other incorrect bit is bit 2, and it is corrected by the syndrome bits after they are changed by correcting one of the two bits in error. If, however, $R_2$ is an invalid combination, then this indicates that bit 2 is good, and the checking process proceeds to check bit 3 of the word.

Bit 3 of the word is checked by comparing the syndrome bits with the code bits of $h_3$ in Table 1. The result of this comparison is $R_3$. If $R_3$ is an invalid combination, this indicates that bit 3 is good, and the checking process continues in like fashion to check bits 4 through 79 until the result of one compare operation yields a valid combination $R_i$ which specifies a single error. In this case $R_i$ corrects one of the double errors; the corrected word changes the syndrome bits; and the changed syndrome bits then specify the other incorrect word bit which is corrected. The second bit in error is then corrected by using the modified syndrome bits. It is seen, therefore, how double errors may be detected and corrected.

The speed at which one of a pair of errors is detected varies with the distribution of the double errors in a word. If one of a pair of errors is in a low order bit, then the speed of which both errors is corrected is much greater than the case where both errors are disposed in high order bits. For example, if one error of a pair of errors is disposed in bit one of a word, then one of the errors is detected and corrected by the first compare operation for the double error case. The second error is in bit one, and the modified syndrome bits are used to correct bit 1. It is seen that the correction process is rapid. If, however, a pair of double errors are disposed in the high order bits, then many compare operations must take place before one of the double errors is found. The worst case for speed of operation occurs when bits 78 and 79 are in error. In this event 78 compare operations must take place before the first one of the double errors is found. In this event $R_{78}$ represents a valid combination, and bit 79 is corrected. Then the syndrome bits are modified, and they are used to correct bit 78 as explained. Thus it is seen that the speed of operation for the double error case depends on the distribution of double errors. Now an arrangement for implementing the foregoing error correction and detection techniques is described.

Reference is made to FIG. 1 which illustrates a system according to this invention. A store 10 supplies information to a data register 12 which in turn supplies such information to an error detection and correction device 14. If the information is free of errors, the error detection and correction device 14 operates a set of gates 16 to transfer the information to a load device 18. If the information from the data register 12 has one or two errors, then the error detection and correction device 14 detects and corrects the single error or the double error. When such one or two errors are corrected, the error detection and correction device 14 operates the gates 16 to transfer the error free information from the data register 12 to the load device 18. The error detection and correction device 14 performs double error detection and correction. The detection and correction code may be any one of the Bose-Chaudhuri class of codes which provide for double error detection and correction. The use of such codes by the error detection and correction device 14 in FIG. 1 increases the reliability of data from the store 10 which is supplied to the load device 18.

Figure 2:
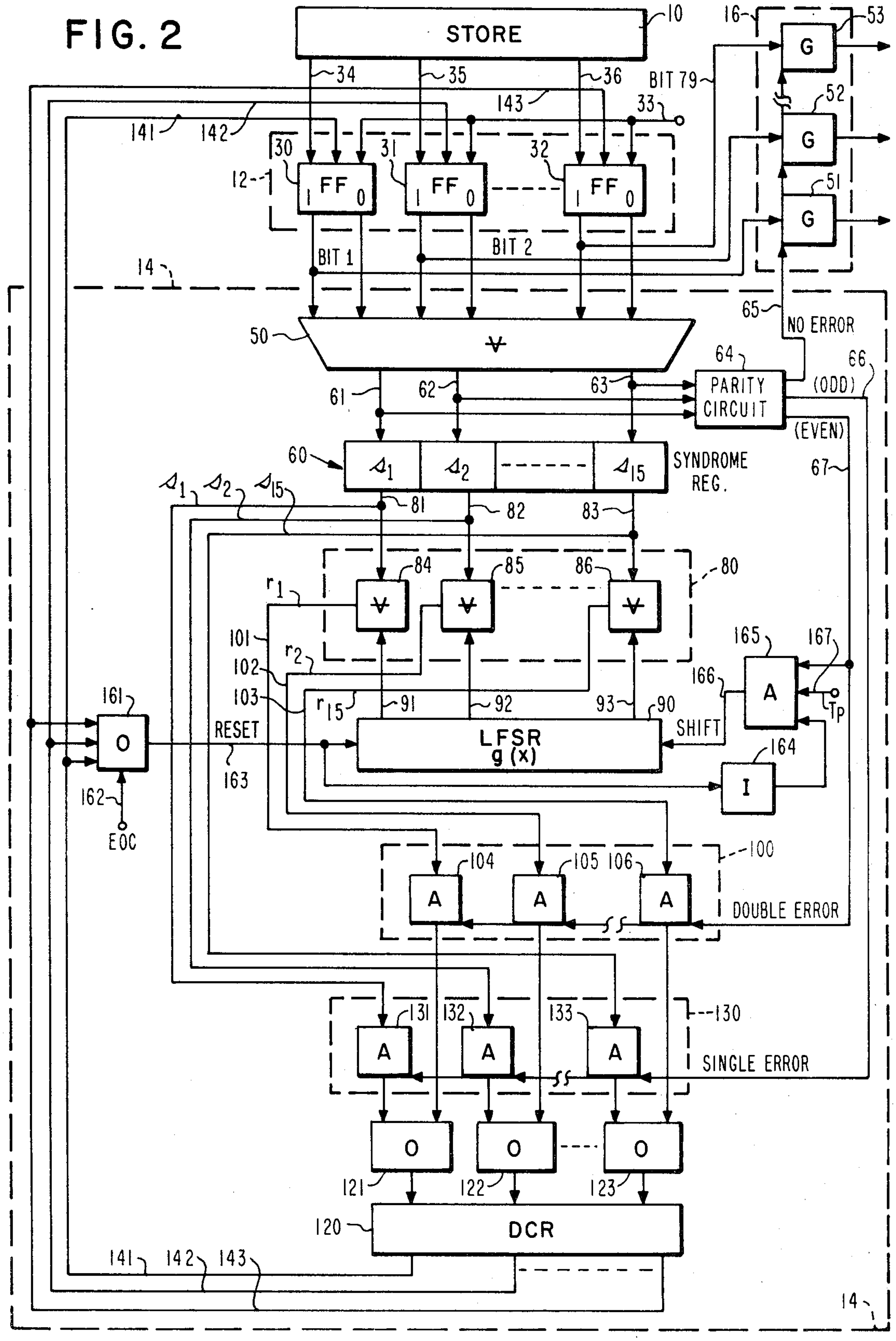
FIG. 2 illustrates an error detection and correction system according to this invention.

Reference is made next to FIG. 2 which illustrates the system in FIG. 1 with the error detection and correction device 14 illustrated in greater detail. Positive logic arbitrarily is assumed in the circuits employed unless indicated otherwise, e.g., positive input signals to an AND circuit provide a positive output signal. Binary 1 is represented by a positive signal, and binary 0 is represented by a negative signal unless otherwise indicated. Words which are 79 bits in length are supplied from the store 10 to the data register 12 and where the bits are stored in associated flip-flops. Only flip-flops 30 through 32 are illustrated, and they store respective word bits 1, 2 and 79. The flip-flops 30 through 32 are reset by a positive signal on a line 33 prior to the transfer of a word from the store 10 to the data register 12, positive signals representing binary ones are supplied to the one input side of the associated flip-flops where binary ones are to be stored in the data register 12. Signals of a word representing 1, 2 and 79 are supplied on respective lines 34 through 36 to the one input side of respective flip-flops 30 to 32. Signals representing binary ones are effective to set the associated flip-flops to the one state. Output signals from the one and the zero output sides of the flip-flops 30 through 32 are supplied to an Exclusive Or tree 50. The one output sides of flip-flops 30 through 32 are supplied to respective gates 51 through 53 of the set of gates 16.

The Exclusive Or tree 50 generates the syndrome $S$ bits $s_1$, $s_2$,–$s_{15}$ which are stored in respective stages $s_1$ through $s_{15}$ of a syndrome register 60. Only three stages of the syndrome register are shown, and signals representing the syndrome bits $s_1$, $s_2$, and $s_{15}$ are supplied on respective lines 61 through 63 to the corresponding stages $s_1$, $s_2$, and $s_{15}$ of the syndrome register 60. Signals on the lines 61 through 63 are also supplied to a parity circuit 64. If the word in the data register 12 is error free, the Exclusive Or tree 50 supplies signals representing binary zeros on all of its fifteen output lines to the parity circuit 64, and the parity circuit 64 in turn supplies a positive signal on a line 65 which indicates there is no error in the information held in the data register 12. The positive signal on the line 65 operates the gates 51 through 53 of the set of gates 16 to transfer the information in the data register 12 to the load device 18 in FIG. 1. If the 15 input signals to the parity circuit 64 have an odd number of binary ones, representing odd parity, then the parity circuit 64 supplies a positive signal on a line 66. However, if the input signals to the parity circuit 64 have an even number of binary ones, representing even parity, then the parity circuit 64 supplies a positive signal on the output line 67. The signals on the lines 66 and 67 are used for purposes discussed subsequently. The parity circuit 64 is described more fully hereinafter.

Output signals from the syndrome register 60 are supplied to a compare circuit 80. The compare circuit 80 has fifteen individual Exclusive Or circuits. Only three Exclusive Or circuits are shown. Signals on respective lines 81 through 83 from the syndrome register 60 are supplied to corresponding Exclusive Or circuits 84 through 86 of the compare circuit 80. A linear feedback shift register 90 has 15 output lines which are connected to the compare circuit 80, but only three of the output lines 91, 92 and 93 are shown. Signals on the output lines 91 through 93 from the linear feedback register 90 are supplied to respective Exclusive Or circuits 84 through 86 of the compare circuit 80. The linear feedback shift register 90 generates the signals representing the rows $h_1$, $h_2$,–$h_{79}$ of the matrix H in Table 1. Signals on the lines 91, 92 and 93 represent the respective columns 1, 2 and 15 of the quantities $h_1$, $h_2$,–$h_{79}$ of the rows in Table 1. The result of the comparison of the syndrome $S$ bits with the quantities $h_1$, $h_2$, etc. in the compare circuit 80 yields $R_1$, $R_2$, etc. The result R at the output of the compare circuit 80 is a modulo 2 sum of these two quantities. The modulo 2 sum is the same as a half add operation where carries, both in and out of each stage, are disregarded. The result R from the compare circuit 80 is supplied to a set of AND circuits 100. Signals from Exclusive Or circuits 84 through 86 are supplied on respective lines 101 through 103 to corresponding AND circuits 104 through 106. The result R from the compare circuit 80 has 15 bits which may be expressed as $r_1$, $r_2$,–$r_{15}$ and the signals $r_1$, $r_2$, $r_{15}$ appear on respective lines 101, 102 and 103. Positive signals on the lines 101 through 103 pass through respective AND circuits 104 through 106 when the control line 67 is energized with a positive signal. A line 67 is energized with a positive signal when a double error occurs. Signals from the AND circuits 104 through 106 are supplied through respective Or circuits 121 through 123 to a decoder 120. A positive signal is supplied on the control line 67 for the double error case.

The syndrome $S$ bits from the syndrome register 60 are supplied to a set of AND circuits 130. The set of AND circuits 130 includes 15 individual AND circuits, but only AND circuits 131 through 133 are shown. The syndrome $S$ bits $s_1$, $s_2$,–$s_{15}$ are passed by a set of AND circuits 130 when a positive signal is supplied on the line 66. A positive signal is supplied on the line 66 for the single error case. In this event the syndrome $S$ bits pass through circuits 131 through 132 and Or circuits 121 through 123 to the decoder 120. The decoder 120 has 15 input lines and 79 output lines. There is one output line for each word bit or stage of the data register 12. Only three input lines and three output lines are illustrated with the decoder 120. Output lines 141 through 143 from the decoder 120 are connected to the complement input of respective flip-flops 30 through 32 of the data register 12. When anyone of the lines 141 through 143 is energized with a positive signal, it complements the state of the associated flip-flop thereby reversing its binary state. The decoder 120, therefore, responds either (1) to 15 syndrome $S$ bits or (2) 15 R bits, if the 15 syndrome $S$ bits or R bits represents a valid combination, the decoder 120 in turn selects one, and only one, of its 79 output lines which is energized with a positive signal thereby to correct an error by complementing the appropriate one of the flip-flops in the data register 12.

Signals on the lines 141 through 143 are supplied also to an Or circuit 161. The Or circuit 161 also receives signals on a line 162. A positive signal from the Or circuit 161 indicates an end of the correction operation. Signals from the Or circuit 161 are applied on a line 163 to the linear feedback shift register 90. Positive signals on the line 163 serve to reset the linear feedback shift register 90. Positive signals on the line 163 are supplied to an inverter 164 which changes the positive signals to negative signals. Negative signals from the inverter 164 decondition an AND circuit 165, and the AND circuit 165 in turn supplies these negative signals on a line 166 which are ineffective to shift the linear feedback shift register 90. If negative signals are supplied on the lines 141 through 143 and 162 in FIG. 2 to the Or circuit 161, then negative signals are supplied to the line 163 which are changed by the inverter 164 to positive signals, and these positive signals condition one input of the AND circuit 165. If the line 67 has a positive signal, a second input to the AND circuit 165 is conditioned. When a positive timing pulse is applied to a line 167, the third input to the AND circuit 165 is conditioned, and the AND circuit 165 then supplies a positive pulse on the line 166 to shift the linear feedback register 90. As the linear feedback shift register 90 is shifted successively, the codes $h_1$, $h_2$,–$h_n$ are generated and supplied to the Exclusive Or circuit 80.

The Exclusive Or tree 50 in FIG. 2 employs the check bits C1 through C15 to check the parity of selected word bits in the manner explained above with reference to equations 3 through 6, and the syndrome bits thus produced are stored in the syndrome register 60. The Exclusive Or tree 50 is not treated in detail herein since its tree arrangement of Exclusive Or circuits readily can be determined from the logic expressed in equations 3 through 6. Reference is made, however, to co-pending application Ser. No. 887,858, "Optimum Apparatus and Method For Checking Bit Generation and Error-Detection, Location and Correction", filed on Dec. 24, 1969, by M. Y. Hsiao et al. which illustrates in detail how such an Exclusive Or tree is constructed for checking purposes.

Figure 3:
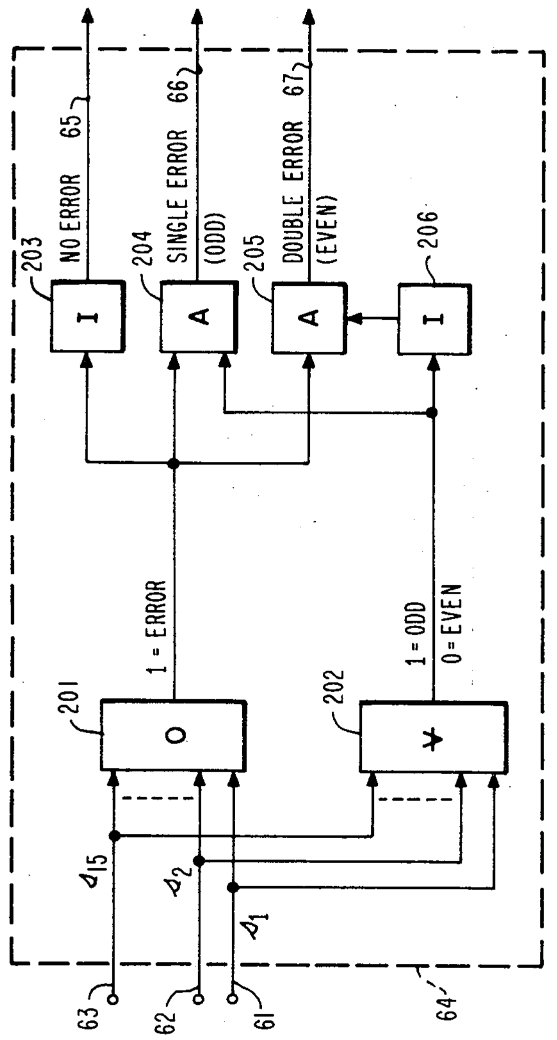
FIG. 3 illustrates in detail a parity circuit shown in block form in FIG. 2.

The parity circuit 64 in FIG. 2 is illustrated in detail in FIG. 3. Referring to FIG. 3, the parity circuit 64 includes an OR circuit 201 and an Exclusive Or circuit 202 which receive the syndrome bits $s_1$ through $s_{15}$. Only lines 61 through 63 are shown which convey respective bits $s_1$, $s_2$ and $s_{15}$. The output of the Or circuit 201 is connected to an inverter 203, an AND circuit 204 and an AND circuit 205. The output of the exclusive Or circuit 202 is connected to the AND circuit 204 and an inverter 206. The Exclusive Or circuit 202 serves the function of indicating whether the syndrome bits $s_1$ through $s_{15}$ have an odd number of binary ones or an even number of binary ones. It is pointed out that any circuit may be substituted for the Exclusive Or circuit 202 which determines whether the parity of the bits $s_1$ through $s_{15}$ is even or odd. However, the Exclusive Or circuit 202 is easy to construct since bits $s_1$ through $s_{14}$ may be divided into seven pairs of bits which pairs of bits are supplied to seven individual Exclusive Or circuits, not shown. The resulting seven outputs plus the bit $s_{15}$ may be divided into four pairs of bits which may be supplied to four additional individual exclusive Or circuits, not shown. The resulting four outputs may be divided into two pairs of bits which may be supplied to a further pair of Exclusive Or circuits, not shown. The resulting two outputs may be then supplied to a last individual Exclusive Or circuit not shown, and its output represents the parity of the bits $s_1$ through $s_{15}$. If the output is a positive signal representing a binary one, the parity is odd, and if the output is a negative signal representing a binary zero, the parity is even. The circuits 203 through 205 supply output signals on respective control lines 65 through 67. A positive signal on the line 65 indicates no error, and a positive signal on the line 66 indicates a single error. A positive signal on the line 67 indicates a double error. Next, the operation of the parity circuit 64 is discussed.

When the 79 bit word is error free, each of the bits $s_1$ through $s_{15}$ represents a binary zero, and the Or circuit 201 supplies a negative signal to the circuits 203 through 205. The negative signal from the Or circuit 201 deconditions the AND circuits 204 and 205. The negative signal from the Or circuit 201 is supplied to the inverter 203, and the inverter 203 in turn supplies a positive output signal on the line 65 which operates the set of gates 16 in FIG. 2 to transfer the 79 bit word to a load device 18 as illustrated in FIG. 1. Some types of load devices do not perform additional checking operations on the data it receives, and in such cases it is necessary to transfer only data bits DB1 through DB64 which are disposed in word bits 16 through 79.

If each one of the syndrome bits $s_1$ through $s_{15}$ does not represent binary zero, then one or more of these bits has a positive signal representing a binary one. In this case, the Or circuit 201 in FIG. 3 supplies a positive signal to the inverter 203 which changes the positive signal to a negative signal on the line 65 thereby to prevent the transfer of data through the set of gates 16 in FIG. 2. The positive signal from the Or circuit 201 conditions one input to the AND circuit 204 and one input to the AND circuit 205. The Exclusive Or circuit 202 determines whether the number of binary ones in the syndrome bits $s_1$ through $s_{15}$ is even or odd. That is, the Exclusive Or circuit 202 determines whether the parity of the bits $s_1$ through $s_{15}$ is even or odd. If the parity is odd, the Exclusive Or circuit 202 supplies a positive signal to the inverter 206 and to the AND circuit 204. This positive signal is changed by the inverter 206 to a negative signal which deconditions the AND circuit 205. The positive signal from the Exclusive Or circuit 202 conditions the second input to the AND circuit 204, and this AND circuit in turn supplies a positive signal on the line 66 which causes a single error detection and correction to take place. If the Exclusive Or circuit 202 determines an even parity for the syndrome bits $s_1$ through $s_{15}$, it supplies a negative signal which deconditions the AND circuit 204, and the negative signal from the Exclusive Or circuit 202 is converted to a positive signal by the inverter 206 which in turn then conditions the AND circuit 205 to supply a positive signal on the line 67. A positive signal on the line 67 initiates a double error detection and correction operation.

Figure 4:
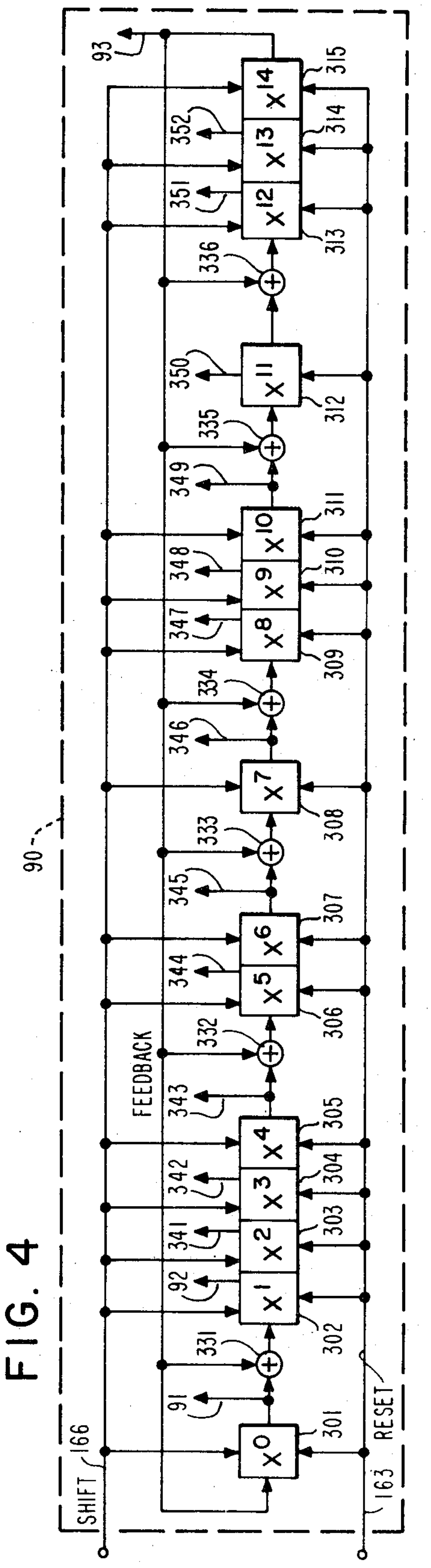
FIG. 4 illustrates in detail the linear feedback shift register shown in block form in FIG. 2.

Reference is made next to FIG. 4 for a detailed illustration of the linear feedback shift register 90 shown in block form in FIG. 2. The linear feedback shift register 90 has stages 301 through 315 with Exclusive Or circuits 331 through 336 interspersed between various stages as shown. The Exclusive Or circuits 331 through 335 perform a half add operation. Exclusive Or circuits 331 through 335 receive a first input from the output of the last stage 315 on the line 93 and a second input from the output of respective stages 301, 305, 307, 308, 311 and 312. The result of the half add operation performed by the Exclusive Or circuits 331 through 336 is stored in respective succeeding stages 302, 306, 308, 309, 312, and 313. Output signals from stages 301 and 302 are supplied on the output lines 91 and 92. The outputs from the stages 303 through 314 are supplied on respective output lines 341 through 352. The output from the stage 315 is supplied on the line 93. The operation of the linear feedback shift register 90 is discussed next.

A positive signal on the line 163 in FIG. 4 resets the linear feedback shift register 90 to its initial state whereby the stage 301 holds a binary one, and the stages 302 through 315 holds binary zeros. The stages 301 through 315 then store the code $h_1$ in Table 1. A positive signal on the line 166 shifts the content of the shift register 90 one stage to the right. When this occurs, the Exclusive Or circuits 331 through 336 perform a half-add operation. The shift in combination with the half add operation modifies the content of the linear feedback shift register. It is readily seen that the binary one stored in the stage 301 is transferred through the Exclusive Or circuit 331 without modification and stored in the stage 302. The content of the linear feedback shift register 90 then represents the code $h_2$ in Table 1. As successive shifts take place the content of the linear feedback shift register 90 generates codes $h_2$ through $h_{79}$ in Table 1. The linear feedback shift register 90 is used only for the case of double error detection and correction. As soon as one of the bits in error is found, a positive signal from the selected one of the lines from the decoder 120 in FIG. 2 passes through the Or circuit 161, resets the linear feedback shift register 90 to its initial state, and terminates further shift operations of the linear feedback shift register 90 by deconditioning the AND circuit 165 to inhibit the passage of further positive timing pulses. The termination of the shift operations take place because the positive signal on the line 163 is changed by the inverter 164 to a negative signal level which deconditions the AND circuit 165 and prevents the passage of further positive timing pulses on the line 167 from passing through the AND circuit 165 and along the line 166 to the linear feedback shift register. Thus, it is seen how the linear feedback shift register 90 in FIG. 4 generates successively the discrete bit combinations of the codes shown in rows 1 through 79 of the matrix H in Table 1. The decoder 120 in FIG. 2 responds to 15 input bits which are the syndrome bits $s_1$ through $s_{15}$ supplied through the set of gates 130 for the single error case or 15 result R bits $r_1$ through $r_{15}$ from the set of gates 100 for the double error case, and the decoder 120 responds to its fifteen input bits to energize one, and only one, of its 79 output lines with a positive signal. There is one output line for each stage of the data register 12 in FIG. 2. The decoder 120 responds only to valid combinations of the input code signals. The valid combinations of input code signals are the discrete codes $h_1$ through $h_{79}$ shown in Table 1. Any other bit combination is an invalid combination. If an invalid combination is supplied to the decoder 120, it does not energize any one of its 79 output lines with a positive signal.

The decoder 120 in its simplest logical form may include 79 AND circuits, one for each row of the matrix H in Table 1. When the 15 input signals to the decoder 120 in FIG. 2 represent $h_1$ in Table 1, the decoder 120 operates a first AND circuit not shown which in turn supplies a positive signal on the line 141 to complement the first word bit by complementing the flip-flop 30. If the input signals to the decoder 120 represent $h_2$ in Table 1, a second AND circuit in the decoder 120, not shown, is operated to supply a positive signal on the line 142 in FIG. 2 which complements the second word bit by complementing the flip-flop 31. In like fashion when the input signals to the decoder 120 represent the codes $h_3$ through $h_{79}$, the decoder 120 supplies positive signals on lines not shown which complement respective word bits 3 through 78. When the input signals to the decoder 120 in FIG. 2 represent the code $h_{79}$ in Table 1, the decoder 120 supplies a positive signal on the line 143 which complements bit 79 of the word by complementing the flip-flop 32. In the interest of simplicity, only the syndrome bits $s_1$, $s_2$, $-s_{15}$ and the result R bits $r_1$, $r_2$–$r_{15}$ are shown in FIG. 2 as being supplied through respective sets of gates 130 and 100 to the decoder 120.

It may be expedient in some instances for a decoder to use both the binary one output and the binary zero output from each stage of a register or storage device for decoding operations thereby to avoid the use of numerous inverter circuits. For this purpose the syndrome register 60 and the compare circuit 80 may be modified to supply both a binary one output and a binary zero output for each bit. In this case, the syndrome bits $\bar{s}_1$, $\bar{s}_2$–$\bar{s}_{15}$ and the result R bits $\bar{r}_1$, $\bar{r}_2$–$\bar{r}_{15}$ may be supplied through additional AND circuits, not shown, in the respective sets of AND circuits 130 and 100 to the decoder 120. This permits the decoder to receive positive signals representing binary zeros for the bits $\bar{s}_1$ through $\bar{s}_{15}$ and the bits $\bar{r}_1$ through $\bar{r}_{15}$. Each AND circuit in the decoder responds only to a valid combination of input signals which are the discrete combination of signals $h_1$ through $h_{79}$ in Table 1. Any other combination of input signals represents an invalid combination, and the AND circuits of the decoder 120 do not respond to them. That is, the decoder 120 does not supply a positive signal on any one of its output lines. Thus, it is seen how the decoder 120 in FIG. 2 may be constructed and operated.

The operation of the error detection and correction arrangement in FIG. 2 is discussed next. A 79 bit word from the store 10 is transferred to the data register 12. The data word includes check bits $C_1$ through $C_{15}$ and data bits $DB_1$ through $DB_{64}$. All bits of the word are supplied to the Exclusive Or tree 50 which checks the bits of the word, and if the output of the Exclusive Or tree 50 is all zeros, the parity circuit 64 supplies a positive signal on the line 65 which operates the set of gates 16 to transfer the word to a load device 18 shown in FIG. 1. If there is a single error in the word, the syndrome $S$ bits stored in the data register 60 have a code combination identical to one of the quantities $h_1$ through $h_{79}$ in Table 1, depending on which one of the 79 word bits is in error. The single error is indicated by the parity circuit 64 which supplies a positive signal on the line 66 that operates the set of gates 130 thereby to supply the syndrome $S$ bits from the syndrome register 60 through the Or circuit 121 through 123 to the decoder 120. The decoder 120 responds to the syndrome $S$ bits and supplies a positive signal on a selected output line which complements the associated stage of the data register thereby to correct the single error in one of the 79 word bits. This demonstrates the case for single error detection and correction which is illustrated in equation 8 above, and bit i of the binary word in the data register 12 is corrected by decoding the syndrome $S$ bits themselves in the decoder 120.

The double error detection and correction case is discussed at this point. If double errors occur in the information stored in the data register 12, then the Exclusive Or tree 50 generates syndrome S bits by the technique expressed in equations 3 through 6. The syndrome $S$ bits thus developed represent the case expressed in equation 9. In this event, either of the quantities $h_i$ or $h_j$ may be compensated or masked out of the syndrome $S$ bits by supplying them to the comparator 80 and comparing them with successive bit combinations $h_1$, $h_2$–$h_{79}$ from the linear feedback shift register 90 until a valid combination of the result R is obtained from the comparator 80. A valid combination of the result R bits is recognized by the decoder 120 at which time further compare operations are terminated. It is appropriate at this point to discuss in detail the manner in which successive compare operations are performed. The parity circuit 64 energizes the line 67 with a positive signal for the double error case. This positive signal energizes the set of gates 100 to supply the result R bits through the Or circuits 121 through 123 to the decoder 120, and this permits the decoder 120 to check the validity of each combination of result R bits from the compare circuit 80. The positive signal on the line 167 is supplied to the AND circuit 165, and the inverter 164 supplies a positive signal to the AND circuit 165 at the commencement of the double error detection and correction process because the decoder 120 supplies negative signals on all of its output lines. Consequently, the negative signals on the lines 141 through 143 pass through the Or circuit 161 along the line 163 to the inverter 164 which converts this negative input level to a positive output level to the AND circuit 165. The linear feedback shift register 90 initially holds the combination of signals represented by $h_1$ in Table 1, and they are supplied to the compare circuit 80 where they are compared with the syndrome $S$ bits to generate the result $R_1$. If the decoder 120 does not recognize the result $R_1$ as a valid combination, the compare operation continues. The next compare operation takes place when a positive timing pulse $T_p$ is supplied on the line 167 to the AND circuit 165. The AND circuit 165 passes this positive timing pulse on the line 166 to shift the linear feedback shift register 90 to one position to the right. The linear feedback shift register 90 then supplies the combination code of signals $h_2$ in Table 1 to the compare circuit 80, and the result $R_2$ is supplied to the decoder 120. If the decoder 120 does not recognize the result $R_2$ as a valid combination of signals, the third compare operation takes place when the next positive timing pulse $T_p$ is supplied to the line 167. The compare operations continue until either of the quantities $h_i$ or $h_j$ is supplied by the linear feedback shift register 90 to the compare circuit 80. If the combination of signals $h_i$ is supplied to the compare circuit 80 by the linear feedback shift register 90, then the combination of the bits of the result R is identical to the combination of the bits $h_j$. On the other hand, if the quantity $h_j$ is supplied by the linear feedback shift register 90 to the compare circuit 80, then the combination of result R bits is identical to the combination of the bits $h_i$. In either event, the result R bits, whether equal to $h_i$ or $h_j$, are recognized by the decoder 120 as a valid combination, and the decoder 120 selects either its output line $i$ or $j$. A positive signal is supplied on the selected output line which complements bit $i$ or bit $j$ of the data register 12, and the positive signal passes through the Or circuit 161 along the line 163 to reset the linear feedback shift register 90. The positive signal on the line 163 is changed to a negative signal by the inverter 164, and the negative signal from the inverter 164 deactivates the AND circuit 165 thereby to prevent further timing pulses $T_p$ from shifting the linear feedback shift register 90. Thus, no further compare operations can take place. It is pointed out that if the linear feedback shift register 90 supplies $h_i$ to the compare circuit 80, then the result R operates the decoder 120 to correct word bits $j$. If the linear feedback shift register 90 supplies $h_j$ to the compare circuit 80, the result R operates the decoder 120 to correct word bit i.

If word bit $i$ is corrected, the content of the data register is changed, and the Exclusive Or tree 50 generates a new set of syndrome bits which are stored in the syndrome register 60. The new syndrome *S* bits from the Exclusive Or tree 50 are supplied also to the parity circuit 64. Since one of the two errors is corrected, the parity circuit 64 terminates the positive signal on the line 67 and establishes a positive signal on the line 66 for the single error case. The positive signal on line 66 operates the set of AND circuits 130 to transfer the modified set of syndrome bits from the syndrome register 60 through the set of AND circuits 130 and associated Or circuits 121 through 123 to the decoder 120. The modified syndrome bits then are identical to the quantity $h_j$ in Table 1, and the decoder 120 recognizes these bits as a valid combination, and it supplies a positive signal on its output line *j* which complements bit *j* in the data register 12. Since the information in the data register 12 is modified again when bit *j* is corrected, the Exclusive Or tree 50 then generates another new set of syndrome bits. The binary word in the data register 12 is now error free; the latest set of syndrome bits are all thus equal to zero; and the parity circuit 64 responds to an input of all zeros to provide a positive signal on the line 65 which operates the set of gates 16 to transfer the word in the data register 12 to the load device 18 in FIG. 1.

It is appropriate at this point to illustrate the operation of the error detection and correction arrangement in FIG. 2 with specific values, and it is assumed for this purpose that the decimal number 6, represented in binary form, is transferred from the store 10 in FIG. 2 to the data register 12. Table 2 is employed as a convenience to represent the various quantities discussed.

TABLE

| | | | | | | | | | | | | | | | | | | | | |
|---|---|---|---|---|---|---|---|---|---|---|---|---|---|---|---|---|---|---|---|---|
| Word Bits | 1 | 2 | 3 | 4 | 5 | 6 | 7 | 8 | 9 | 10 | 11 | 12 | 13 | 14 | 15 | 16 | 17 | 18 | 19 . . . 79 | 1 |
| Function | C1 | C2 | C3 | C4 | C5 | C6 | C7 | C8 | C9 | C10 | C11 | C12 | C13 | C14 | C15 | DB1 | DB2 | DB3 | DB4 . . . DB64 | 2 |
| N=6 | 0 | 1 | 0 | 1 | 0 | 0 | 1 | 1 | 1 | 0 | 1 | 0 | 1 | 0 | 1 | 0 | 1 | 1 | 0 . . . 0 | 3 |
| Single Error | | X | | | | | | | | | | | | | | | | | | 4 |
| Incorrect word | 0 | 0 | 0 | 1 | 0 | 0 | 1 | 1 | 1 | 0 | 1 | 0 | 1 | 0 | 1 | 0 | 1 | 1 | 0 . . . 0 | 5 |
| $S=h_2=$ | 0 | 1 | 0 | 0 | 0 | 0 | 0 | 0 | 0 | 0 | 0 | 0 | 0 | 0 | 0 | 0 | — | — | — — | 6 |
| Double Errors | | X | | | | | | | | | | | | | | | | X | | 7 |
| Incorrect Word | 0 | 0 | 0 | 1 | 0 | 0 | 1 | 1 | 1 | 0 | 1 | 0 | 1 | 0 | 1 | 0 | 1 | 0 | 0 . . . 0 | 8 |
| $S_x=h_2 V h_{18}=$ | 0 | 1 | 1 | 1 | 0 | 0 | 0 | 1 | 0 | 1 | 1 | 0 | 0 | 1 | 1 | | | | | 9 |
| $h_1=$ | 1 | 0 | 0 | 0 | 0 | 0 | 0 | 0 | 0 | 0 | 0 | 0 | 0 | 0 | 0 | | | | | 10 |
| $R_1=S_x V h_1=$ | 1 | 1 | 1 | 1 | 0 | 0 | 0 | 1 | 0 | 1 | 1 | 0 | 0 | 1 | 1 | | | | | 11 |
| $h_2=$ | 0 | 1 | 0 | 0 | 0 | 0 | 0 | 0 | 0 | 0 | 0 | 0 | 0 | 0 | 0 | | | | | 12 |
| $R=S_x V h_2 h_{18}$ | 0 | 0 | 1 | 1 | 0 | 0 | 0 | 1 | 0 | 1 | 1 | 0 | 0 | 1 | 1 | | | | | 13 |
| $S_x \; h_2$ | 0 | 1 | 0 | 0 | 0 | 0 | 0 | 0 | 0 | 0 | 0 | 0 | 0 | 0 | 0 | | | | | 14 |

Row 1 of Table 2 illustrates word bits 1 through 79. Row 2 illustrates the function of the bits. Word bits 1 through 15 are employed as check bits C1 through C15, and word bits 16 through 79 serve as respective data bits DB1 through DB64. Row 3 of Table 2 illustrates the binary content of the word bits 1 through 79 for the decimal number N having the assumed value of six. Check bits C2, C4, C7, C8, C9, C11, C13 and C15 hold binary ones. Data bits DB2 and DB3 hold binary ones. All other bits hold binary zeros. The Exclusive Or tree 50 generates syndrome *S* bits each of which represents binary zero since the information in the data register 12 is error free, and the parity circuit 64 certifies that the word is correct by generating a positive signal on the line 65 in the manner earlier explained which operates the set of gates 16 to transfer the word from the data register 12 to a load device 18 shown in FIG. 1.

It is assumed for purposes of illustration that the very same word is supplied to the data register 12 with a single error, and let it be assumed further that the error is in word bit 2. The location of the error is illustrated in row 4 of Table 2. The incorrect word is illustrated in row 5 of Table 2 where bit 2 incorrectly holds a binary zero. The Exclusive Or circuit 50 in FIG. 2 generates the syndrome *S* bits $s_1$ through $s_{15}$ according to equations 4 through 6. This yields the bit combination shown in row 6 of Table 2, and this bit combination is identical to $h_2$ in Table 1. Therefore, the parity circuit 64 responds to the positive signal representing a binary one for the syndrome bit $s_2$, and it supplies a positive signal on the line 66 which operates the set of gates 130 to transfer the syndrome bits in row 6 of Table 2 from the syndrome register 60 through the Or circuits 121 through 123 to the decoder 120. The decoder 120 recognizes the bit combination $h_2$ in row 6 of Table 2 as a valid combination, and it supplies a positive signal on the line 142 which complements the flip-flop 31 thereby to change it from the zero state to the one state. The content of the data register 12 is thereby changed to the correct word illustrated in row 3 of Table 2, and the Exclusive Or tree 50 then generates syndrome bits which are all zeros. The parity circuit 64 in FIG. 2 in turn certifies that this word is correct by generating a positive signal on the line 65 which operates the set of gates 16 to transfer the word from the data register 12 to a load device 18 shown in FIG. 1.

Let it be assumed next that the same word having the decimal value of six is transferred from the store 10 in FIG. 2 to the data register 12 with double errors. Let it be assumed further that the bits in error are word bit 2 which is check bit C2 and word bit 18 which is data bit DB3. This double error combination is illustrated in row 7 of Table 2. The incorrect word then in the data register 12 is shown in row 8 of Table 2. Word bit 2 holds a binary zero when it should hold a binary one, and word bit 18 holds binary zero when it should hold a binary one. The Exclusive Or circuit 50 in FIG. 2 generates the syndrome bits $s_1$ through $s_{15}$ according to equations 4 through 6. The syndrome bits thus generated by the Exclusive Or tree 50 are shown in row 9 of Table 2. It is pointed out that there are eight binary ones in row 9 of Table 2. The parity circuit 64 determines that there are an even number of binary ones in the syndrome bits, indicating a double error, and it supplies a positive signal on the line 67 in FIG. 2 which conditions the set of gates 100 to transfer the output R of the compare circuit 80 through the associated Or circuits 121 through 123 to the decoder 120. The parity circuit 64 supplies a negative signal level on the line 66 which inhibits the operation of the set of AND circuits 130. The linear feedback shift register 90 supplies the code bits $h_1$ shown in row 10 of Table 2 to the compare circuit 80 in FIG. 2, and the syndrome register 60 supplies the syndrome bits $S_x$ shown in row 9 of Table 2 to the compare circuit 80 in FIG. 2. The compare circuit 80 performs a compare operation to generate the result $R_1 = S_x \forall h_1$ which is shown in row 11 of Table 2. If the bits for $h_1$ in row 10 of Table 2 are half added to the syndrome bits $S_x$ in row 9, this yields the combination of bits for $R_1$ in row 11 of Table 2. It is readily seen by inspection that the combination of bits in row 11 of Table 2 is not identical to the combination of bits in any row of Table 1. Consequently the decoder 120 in FIG. 2 does not recognize $R_1$ as a valid combination of bits, and the decoder 120 is not operated.

As soon as a positive timing pulse $T_p$ is applied on the line 167 in FIG. 2, the AND circuit 165 supplies a positive pulse on the line 166 to shift the linear feedback shift register 90 to one position to the right. The linear feedback shift register 90 then supplies the code $h_2$, shown in row 12 of Table 2, to the compare circuit 80, and the syndrome register 60 still supplies the syndrome bits $S_x$, shown in row 9 of Table 2, to the compare circuit 80 in FIG. 2. The result $R_2$ of this comparison is shown in row 13 of Table 2. The bits $R_2$ are obtained by half adding the bits of row 9 of Table 2 with the bits of row 12. It is readily seen by inspection that the combination of bits $R_2$ in row 13 of Table 2 is identical to the combination of bits for code $h_{18}$ of Table 1. Thus, the compare operation resulted in the compensating or masking out the quantity $h_2$ from the syndrome bits $S_x$. Consequently, the combination of bits $R_2$ is recognized by the decoder 120 in FIG. 2 as a valid combination, and it supplies a positive signal on a line, not shown, to complement word bit 18, also not shown, in the data register 12. As soon as the word bit 18 is complemented from the zero state to the binary one state, the binary word in the data register 12 then holds a single error in word bit 2 (check bit C2). The data register then holds the binary word shown in row 5 of Table 2. The Exclusive Or tree 50 responds to this word in the data register 12 and generates a new set of syndrome bits $s_1$ through $s_{15}$ according to equations 4 through 6. The new set of syndrome $S$ bits thus generated are shown in row 14 of Table 2. It is readily seen that the combination of bits in row 14 of Table 2 is identical to the combination of bits $h_2$ in row 2 of Table 1. It is pointed out that there is only one binary 1 in the combination of syndrome bits $S_x$ in row 14 of Table 2. They are supplied to the parity circuit 64 in FIG. 2 which determines that the parity of the syndrome bits $S_x$ is odd, and it supplies a positive signal on the line 66 which operates the set of gates 130 to transfer the syndrome bits from the syndrome register 60 through the associated Or circuits 121 through 123 to the decoder 120. The decoder 120 recognizes the combination of bits in row 14 of Table 2 as a valid combination of bits, and it supplies a positive signal on the line 142 which complements the flip-flop 31 of the data register 12. Thus, it is seen how the second error in word bit 2 is detected and corrected. As soon as the word bit 2 is corrected, the Exclusive Or tree 50 generates a new set of syndrome bits according to equations 4 through 6. The new set of syndrome bits are all zeros. Consequently the parity circuit 64 in FIG. 2 responds to an input of all zeros, and it supplies a positive signal on the line 65 which operates the set of gates 16 to transfer the corrected word in the data register 12 to a load device 18 shown in FIG. 1. It is seen, therefore, how double errors are detected and corrected.

Figure 5:
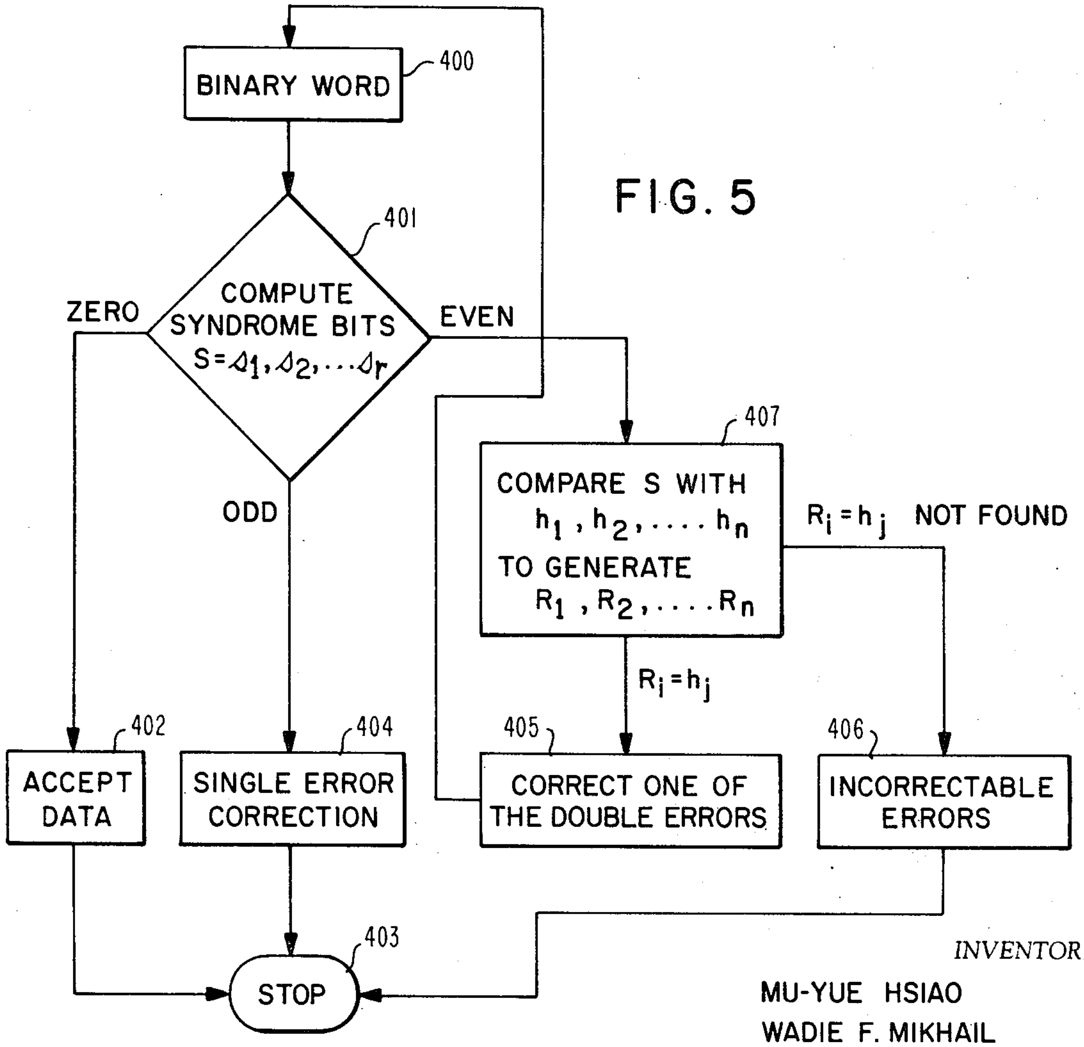
FIG. 5 is a flow chart which illustrates the novel method of detecting and correcting single and double errors according to their invention.

Reference is made to FIG. 5 which is a flow chart illustrating the steps of the novel algorithm for detecting and correcting single and double errors according to this invention. A binary word is represented by the block 400, and the binary word includes check bits and data bits. The first step is to compute or determine the syndrome bits, and this is represented by the block 401. If the parity of the syndrome bits is zero, the data is accepted as being error free, and this is represented by the block 402. The checking process then is stopped, and this is represented by the block 403. If the parity of the syndrome bits $S$ is odd, a single error is assumed. The syndrome bits $S$ themselves are used to correct the single error, and this is represented by the block 404. This terminates the error correction process as indicated by the block 403. If the parity of the computed syndrome $S$ bits is even, then double errors are assumed, and the syndrome $S$ bits are compared with discrete combinations of code bits $h_1$, $h_2$,–$h_n$ to generate successive results $R_1$, $R_2$,–$R_n$. This is indicated by the block 407. If $R_i = h_j$ is found, then $R_i$ is a valid combination which is decoded to correct one of the double errors. This is indicated by the block 405. After the binary word is modified to correct one of the errors, the syndrome $S$ bits are recomputed from the modified binary word, and the parity of the recomputed syndrome $S$ should be odd in which case the remaining single error is corrected as indicated by the block 404, and the correction process is terminated as indicated by the block 403. Thus, it is seen that double errors are corrected provided the basic assumption is valid which is that two, and only two, errors are present. If this basic assumption is not valid, the result $R_i = h_j$ is not found by the compare operations. Then there are more than two errors, and there are an incorrectible number of errors. This is indicated by the block 406, and the correction process is terminated as indicated by the block 403. The novel method according to this invention may be summarized as including the steps of:

1. generating syndrome bits $s_1$, $s_2$,–$s_r$ from check bits and data bits of a binary word.

2. comparing the syndrome bits with discrete code bit combinations $h_1$, $h_2$,–$h_n$ of a matrix H to generate a result $R_i = S \forall h_i = h_j$ when word bits $i$ and $j$ are in error.

3. using $R_i$ to correct word bit $j$.

4 then generating a new set of syndrome bits where $S = h_i$ for the remaining single error, and 5 using $S = h_i$ to correct bit i of the binary word.

While the invention has been particularly shown and described with reference to a preferred embodiment thereof, it will be understood by those skilled in the art that various changes in form and details may be made therein without departing from the spirit and scope of the invention.

What is claimed is:

1. An error detection and correction device including:

register means which stores bits of a binary word having check bits and data bits, checking means connected to the register means which compares each check bit with various data bits thereby to generate syndrome $S$ bits, a source of signals representing discrete code bit combinations $h_1, h_2,–h_n$ of a matrix H, third means connected to the checking means and said source of signals to generate a result $R_i$ where $R_i = S \forall h_i = h_j$ when errors occur in word bits i and j of the register means, and fourth means connected to the checking means, the third means, and the register means which corrects word bits $i$ and $j$ of the register means.

2. The apparatus of claim 1 wherein the third means includes half adder means connected to the checking means and the source of signals, and said source of signals includes further means which supplies the discrete code bit combinations $h_1, h_2,–h_n$ successively to the half adder means until the result $R_i$ is generated.

3. The apparatus of claim 2 wherein the half adder means is composed of Exclusive Or circuits.

4. An error detection and correction device including:

first means which stores word bits of a binary word having check bits and data bits, second means connected to the first means which generates syndrome bits S, a source of signals representing discrete code bit combinations $h_1, h_2–h_n$ of a matrix H, third means connected to the second means and said source of signals which compares the syndrome bits $S$ with discrete code bit combinations $h_1, h_2,–h_n$ of a matrix H to generate a result $R_i$ where $R_i = S \forall h_i = h_j$ when errors occur in word bits i and j of the first means, and fourth means connected to the second means, the third means, and the first means which corrects bits $i$ and $j$ of the first means.

5. The apparatus of claim 4 wherein:

the third means includes a compare circuit connected to the second means and said source of signals, and said source of signals includes fifth means connected to the compare circuit which supplies the discrete code bit combinations $h_1, h_2,–h_n$ successively to the compare circuit until the result $R_i$ is generated.

6. An error detection and correction arrangement including:

register means to store a binary word having bits 1, 2,–$n$ which includes a check bits C1, C2,–$C_r$ and data bits DB1, DB2,–$DB_{n-r}$.

second means connected to the register means which responds to the check bits and data bits and generates syndrome bits where $S = s_1, s_2,–s_r$ and $S = h_i \forall h_j$ when word bits $i$ and $j$ are in error, third means for supplying successive discrete combinations of code bits from a matrix H where $H = h_1, h_2,–h_n$ code combinations, half adder means connected between the second means and the third which performs half add operations on the syndrome bits S and the successive discrete combinations of the code bits $h_1, h_2,–h_n$ ultimately generates a result $R_i = S \forall h_i = h_j$ when word bits $i$ and $j$ are in error, and fourth means connected between the half adder means, the second means, and the register means which corrects the word bits $i$ and $j$ of the register means after $R_i$ is determined.

7. An error detection and correction arrangement including:

first means to store a binary word having bits 1, 2,–$n$ which includes check bits C1, C2,–$C_r$ and data bits DB1, DB2,–$DB_{n-r}$.

second means connected to the first means which responds to the check bits and data bits and generates syndrome bits where $S = s_1, s_2,–s_r$ and $S = h_i \forall h_j$ when word bits $i$ and $j$ are in error, third means for supplying successive discrete combinations of code bits from a matrix H where $H = h_1, h_2,–h_n$ code combinations, comparing means, means connecting the second means and the third means to the comparing means, said comparing means ultimately generating a result $R_i = S \forall h_i = h_j$ when word bits $i$ and $j$ are in error, and fourth means connected between the comparing means and the first means which responds to the result $R_i$ to correct word bit $j$ of the first means.

8. The apparatus of claim 7 wherein the fourth means corrects word bit $j$ and thereafter the second means generates a new set of syndrome bits $S$, and fifth means connected between the second means and the fourth means which supplies the syndrome bits $S$ to the fourth means when a single error exists in the word bits of the first means, whereby the syndrome bits $S$ operate the fourth means to correct the remaining single error in word bit $i$ of the first means.

9. An error detection and correction device including:

a register for holding word bits of a binary word having check bits and data bits, an Exclusive Or tree connected to said register for generating syndrome bits from the check bits and data bits, error detector means connected to the Exclusive Or tree which energizes a first line to indicate no error, a second line to indicate an even number of errors, and a third line to indicate an odd number of errors, a first set of gates, a second set of gates, and a third set of gates, means connecting said first set of gates to said register, a load device connected to said first set of gates, means connecting said first line to control said first set of gates whereby the content of the first register is transferred to the load device when no error is indicated, means connecting the Exclusive Or tree to the second set of gates, a decoder, means connecting the second set of gates to said decoder, means connecting the third line to control the second set of gates whereby the syndrome bits are supplied to the decoder when an odd number of errors is indicated, a linear feedback shift register for generating successive error correction codes $h_1, h_2,–h_n$, a compare circuit connected to the Exclusive Or tree and the linear feedback shift register which performs a half add operation on the error correction codes and the syndrome bits to generate a result, means connecting the compare circuit to the third set of gates, means connecting the second line to control the third set of gates whereby the result from the compare circuit is supplied to the decoder when an even number of errors is indicated, and means connecting said decoder to said register for modifying the content of said register, and the decoder responding to the result from the compare circuit or syndrome bits from the Exclusive Or tree to correct any check bit or data bit in said register.

10. The apparatus of claim 9 further including a syndrome register, means connecting the syndrome register between the Exclusive Or tree and the compare circuit, and means connecting the syndrome register to the second set of gates.

11. An error detection and correction device including:

a register for holding word bits of a binary word having check bits and data bits, an Exclusive Or tree connected to the register which compares each check bit with various data bits thereby to generate syndrome $S$ bits, a source of signals representing discrete code bit combination $h_1, h_2, -h_n$ of a matrix H, first means connected to the Exclusive Or tree and said source of signals which compares the syndrome $S$ bits with discrete code bit combinations $h_1, h_2 -h_n$ of a matrix H to generate a result $R_i$ where $R_i = S \forall h_i = h_j$ when errors occur in word bits $i$ and $j$ of said register, and second means connected to the first means and the register when responds to the result $R_1$ and corrects word bit $j$ in said register.

12. The apparatus of claim 11 further including third means connected between the Exclusive Or tree and the second means for supplying the syndrome $S$ bits to the second means, and said second means responds to the syndrome $S$ bits to correct word bit i in said register after word bit $j$ of said register is corrected.

13. The method of detecting and correcting errors in word bits of a binary word having check bits and data bits, the method comprising the steps of:

1. generating syndrome bits $s_1, s_2, -s_r$ from the check bits and data bits,
2. comparing the syndrome $S$ bits with discrete code bit combinations $h_1, h_2, -h_n$ of a matrix H to generate a result $R_i = S \forall h_i = h_j$ when word bits $i$ and j are in error, and
3. correcting word bits $i$ and $j$ after the result $R_i$ is determined.

14. The method of detecting and correcting errors in word bits of a binary word having check bits and data bits, the method comprising the steps of:

1. generating syndrome $S$ bits $s_1, s_2, -s_r$ from the check bits and data bits,
2. comparing the syndrome S bits with discrete code bit combinations $h_1, h_2, -h_n$ of a matrix H to generate a result $R_i = S \forall h_i = h_j$ when word bits $i$ and $j$ are in error,
3. using $R_i$ to correct word bit $j$,
4. then generating a new set of syndrome $S$ bits where $S = h_i$ for the remaining single error, and
5. using $S = h_i$ to correct bit $i$ of the binary word.

15. The method of detecting and correcting errors in word bits of a binary word having check bits C1, C2,–C $_r$ and data bits DB1, DB2,–DB$_{n-r}$, the method of comprising the steps of:

1. generating syndrome S bits $s_1, s_2, -s_r$ from the check bits and the data bits,
2. providing discrete code bit combinations $h_1, h_2, -h_n$ of a matrix H,
3. comparing the syndrome bits S with the discrete combinations of code bits $h_1, h_2, -h_n$ to generate a result $R_i = S \forall h_i = h_j$ when word bits $i$ and $j$ are in error, and
4. correcting word bits $i$ and $j$ after the result $R_i$ is determined.

16. The method of detecting and correcting errors in word bits of a binary word having check bits C1, C2,–C $_r$ and data bits DB1, DB2,–DB$_{n-r}$, the method of comprising the steps of:

1. generating syndrome S bits $s_1, s_2, -s_r$ from the check bits and the data bits,
2. providing discrete code bit combinations $h_1, h_2, -h_n$ of a matrix H,
3. comparing the syndrome $S$ bits with the discrete combinations of code bits $h_1, h_2, -h_n$ to generate a result $R_i = S \forall h_i = h_j$ when word bits $i$ and $j$ are in error,
4. using $R_i = h_j$ to correct bit $j$ of the word,
5. then generating syndrome bits $S = h_i$ and using the syndrome bits to correct bit $i$ of the word.

* * * * *